Jan. 26, 1932.  A. F. MASURY  1,842,794
DUSTPROOF ASH BODY
Filed March 17, 1930   2 Sheets-Sheet 1
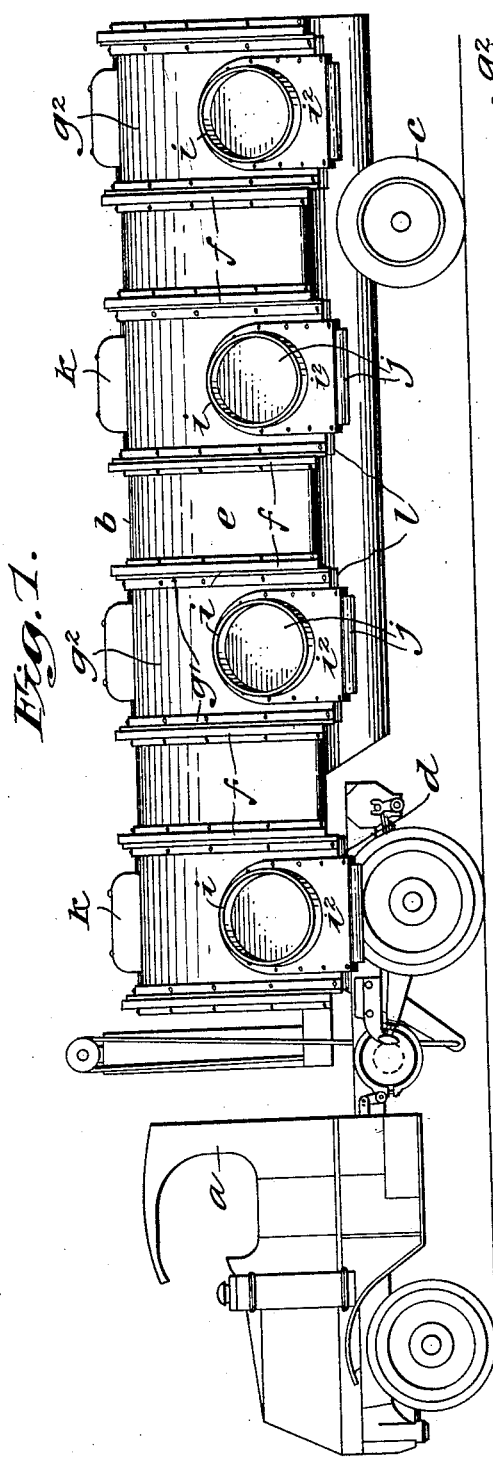
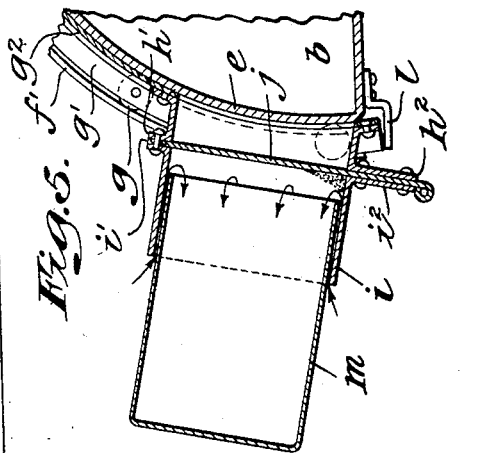
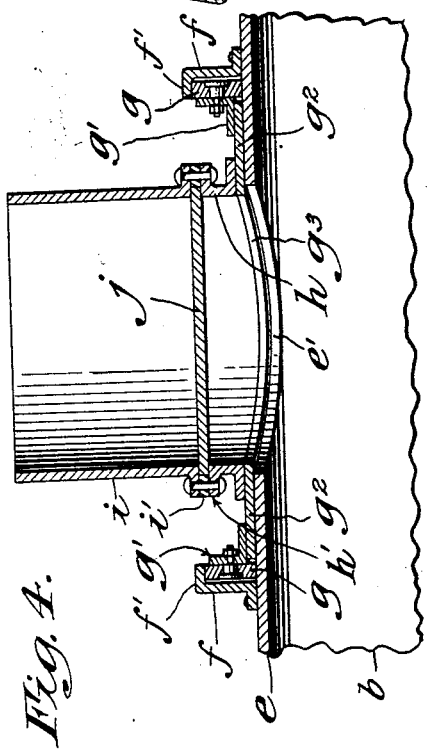
Inventor:
Alfred H. Masury
By his Attorneys
Redding, Greeley, O'Shea & Campbell Jan. 26, 1932.　　　A. F. MASURY　　　1,842,794
DUSTPROOF ASH BODY
Filed March 17, 1930　　2 Sheets-Sheet 2
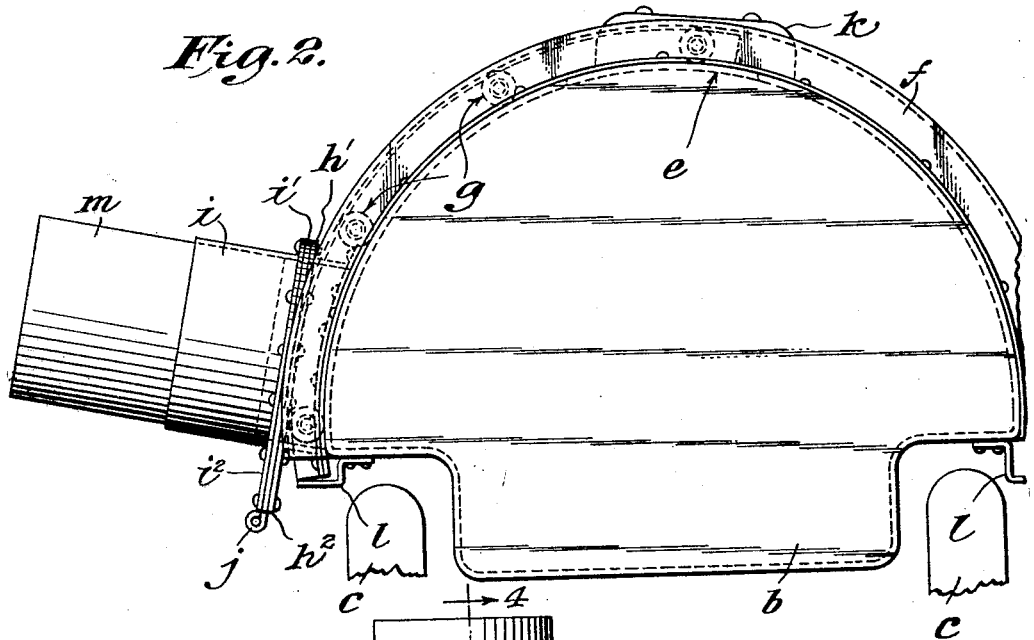
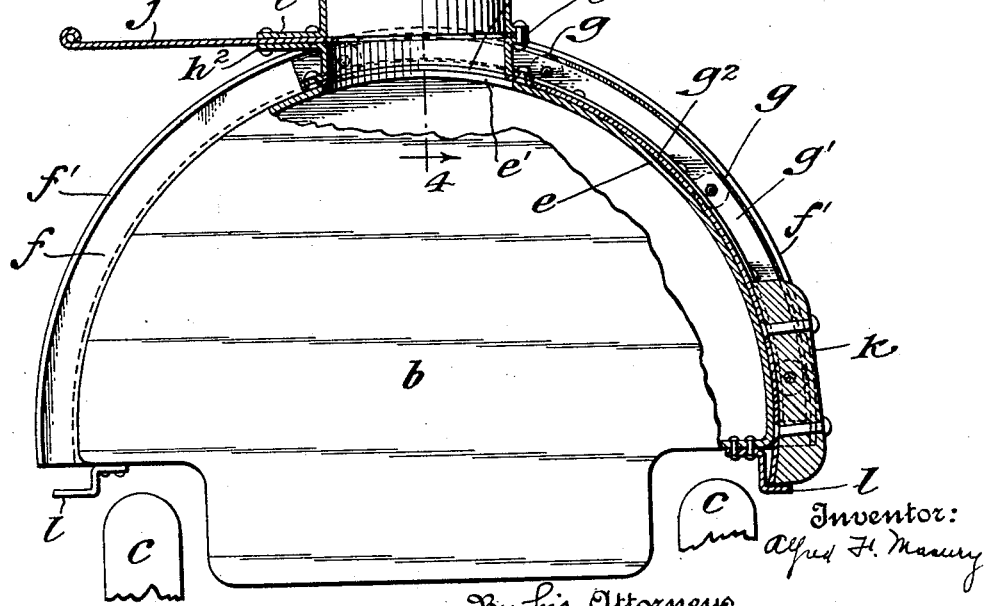

Patented Jan. 26, 1932

1,842,794

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

DUSTPROOF ASH BODY

Application filed March 17, 1930. Serial No. 436,380.

The present invention relates to motor vehicles of the commercial body type and embodies, more specifically, an improved body construction adapted particularly to receive ashes and the like, the construction thereof being such as to prevent the creation of excessive dust when the ashes are dumped into the body.

More particularly, the invention embodies an improved vehicle body which is dust proof and which eliminates all dust during the dumping of ashes thereinto.

Little need be said as to the unsightly and unsanitary condition usually prevailing in the collection of ashes. In addition to excessive dust, when ashes are dumped into the collecting vehicle, such vehicle is usually exposed and gusts of wind and jarring of the vehicle results in the creation of undesirable dust. The present invention embodies an improved vehicle which prevents the existence of casual dust from the ashes, at the same time providing an improved device for dumping the contents of ash receptacles into the body, such operation being accompanied by the creation of little or no dust in the vicinity of the vehicle.

An object of the invention, accordingly, is to provide a vehicle body adapted to receive ashes and of such character that no dust is created when ashes are dumped thereinto.

A further object of the invention is to provide an improved vehicle body by means of which the existence of dust in the vicinity thereof is prevented.

Further objects, not specifically enumerated above, will be apparent as the invention is described in greater detail in connection with the accompanying drawings, wherein:

Figure 1 is a view in side elevation, showing a vehicle constructed in accordance with the present invention.

Figure 2 is a view in rear elevation, showing the body of Figure 1 and an ash receptacle applied to the body preparatory to dumping the same.

Figure 3 is a view similar to Figure 2, partly broken away and in section, showing the ash receptacle moved into dumping position.

Figure 4 is a view in section, taken on line 4—4 of Figure 3, and looking in the direction of the arrows.

Figure 5 is a segmental view, similar to Figure 2, showing the manner in which a vacuum is created to eliminate the dust which usually results from the dumping operation.

Referring to the above drawings, a suitable tractor $a$ is illustrated, in the form shown, a motor vehicle being utilized, this vehicle being provided with a trailer $b$ mounted at its rear end upon wheels $c$ and at its forward end upon a fifth wheel $d$, carried by the tractor $a$. The body of the trailer $b$ is preferably formed with a cylindrical upper portion $e$ which is closed completely at all sides.

At the upper extremities of the body $e$, apertures $e'$ are formed, the apertures being suitably spaced and provided in the desired intervals along the top of the body. It will be apparent that any number of apertures may be used, in the present instance, four being shown. Upon opposite sides of each aperture, suitable channels $f$ are mounted, the channels being formed with flanges $f'$ which serve as internal tracks for rollers $g$, mounted upon angles $g'$ which are secured to the respective sliding plates $g^2$. Plates $g^2$ are curved to conform to the cylindrical surface of the body $e$ and the rollers, mounted between the flanges $f'$ and the surface of the body, facilitate the sliding of plates $g^2$ over the body.

Each plate $g^2$ is formed with an aperture $g^3$ which is adapted to overlie the respective apertures $e'$ in the body and permit access to the body. At one end of each plate $g^2$, and over the apertures therein, a cylindrical fitting $h$ is secured, the fitting being formed with a plain peripheral flange $h'$ to which a cylindrical bushing $i$ is secured, a spacing member $i'$ being provided to space the fitting and bushing properly. Between the fitting and bushing, and in the plane of the spacing member $i'$, a sliding gate $j$ is mounted, this gate being readily moved into an open position as illustrated in Figure 3, or a closed position as shown in Figure 2. Extensions $i^2$ and $h^2$ are formed on the bushing and fitting, respectively, and afford a sufficiently large bearing area for the gate $j$. At the end of each plate $g^2$, distant from the respective apertures $g^3$, a counterweight $k$ is secured to the plate, this counterweight serving to facilitate movement thereof between opened and closed positions. Stops $l$ are preferably mounted upon the body at the extremities of the tracks $f'$ and limit the movement of the respective slides.

In operation, the slides are normally in the position shown in Figure 1. To dump ash cans and the like, the can $m$ is inserted in one of the bushings $i$, with its open end thereof adjacent the gate $j$ and the slide is moved to the position shown in Figure 3. The gate $j$ is now opened and the contents of the can fall into the body $b$. The slide $g^2$ is then moved into its normal position, shown in Figure 1, at which time the aperture $e'$ is shut and the gate $j$ is closed. Upon removing the can from the bushing $i$, a suction is created within the bushing due to the relatively close fitting of the can within the bushing and to the outward movement of the can, and the resulting air currents will be as illustrated by the arrows in Figure 5. In this manner, any dust particles which may be present will be carried into the can and the disagreeable dust usually attending operations of this character will be completely eliminated.

While the invention has been described with specific reference to the accompanying drawings, it is not to be limited, save as defined in the appended claims.

I claim as my invention:

1. A vehicle body having a closed cylindrically shaped top thereon, an aperture in the top, channels on the top on opposite sides of the aperture, flanges on the channels forming tracks spaced from the top, a closure curved to conform to the surface of the top, rollers on the closure between the tracks and top, and means on the closure to support a receptacle for dumping.

2. A vehicle body having a closed cylindrically shaped top thereon, an aperture in the top adjacent the top thereof, tracks on the top on opposite sides of the aperture, a closure curved to conform to the surface of the top, means on the closure to support a receptacle for dumping, and rollers on the closure engaging the tracks to mount the closure slidably.

3. A vehicle body having a closed cylindrically shaped top thereon, an aperture in the top, tracks on the top on opposite sides of the aperture, a closure curved to conform to the surface of the top, means on the closure to support a receptacle for dumping, and rollers on the closure engaging the tracks to mount the closure slidably.

4. A vehicle body having a closed cylindrically shaped top thereon, an aperture in the top, tracks on the top on opposite sides of the aperture, a closure curved to conform to the surface of the top, means to mount the closure slidably upon the tracks, and means on the closure to support a receptacle for dumping.

5. A vehicle body having a closed cylindrically shaped top thereon, an aperture in the top, a closure slidably mounted on the top and movable over the aperture, and means on the closure to support a receptacle for dumping.

6. A closed vehicle body, an aperture therein, a closure for the aperture, an aperture in the closure adapted to overlie the first aperture upon predetermined movement of the closure, means to support a receptacle over the last aperture, and a counter-weight on the closure.

7. A closed vehicle body, an aperture therein, a movable closure for the aperture, an aperture in the closure adapted to overlie the first aperture upon predetermined movement of the closure, means to support a receptacle over the last aperture, a gate carried by the supporting means, and a cylindrical receptacle receiving means over the gate.

8. A closed vehicle body, an aperture therein, a movable closure for the aperture, an aperture in the closure adapted to overlie the first aperture upon predetermined movement of the closure, means to support a receptacle over the last aperture, and a slidable gate carried by the supporting means.

9. A closed vehicle body, an aperture therein, a movable closure for the aperture, an aperture in the closure adapted to overlie the first aperture upon predetermined movement of the closure, means to support a receptacle over the last aperture, and a gate carried by the supporting means.

10. A closed vehicle body, an aperture therein, a movable closure for the aperture, an aperture in the closure adapted to overlie the first aperture upon predetermined movement of the closure, means to support a receptacle over the last aperture, and means to close the last aperture.

This specification signed this 14th day of March, A. D. 1930.

ALFRED F. MASURY.